Dec. 18, 1923.

E. F. KINZLER

INDICATOR

Filed March 30, 1922

1,477,962

INVENTOR
Edward F. Kinzler
By Kay Totten Brown
attys

Patented Dec. 18, 1923.

1,477,962

UNITED STATES PATENT OFFICE.

EDWARD F. KINZLER, OF PITTSBURGH, PENNSYLVANIA.

INDICATOR.

Application filed March 30, 1922. Serial No. 548,178.

*To all whom it may concern:*

Be it known that I, EDWARD F. KINZLER, a citizen of the United States, and resident of Pittsburgh, in the county of Allegheny and State of Pennsylvania, have invented a new and useful Improvement in Indicators; and I do hereby declare the following to be a full, clear, and exact description thereof.

My invention relates to indicators, more especially to that type in which there is a spring-actuated indicator hand adapted to move over the face of a dial or graduated scale.

The object of my invention is to provide an indicator of this character in which the indicator hand has a positive movement, free from vibrations or oscillations, due to lost motion in the gearing, so that it moves steadily into indicating position and remains in that position, so that it gives an accurate reading at once without having to wait for it to settle down to a stationary position.

Figure 1:
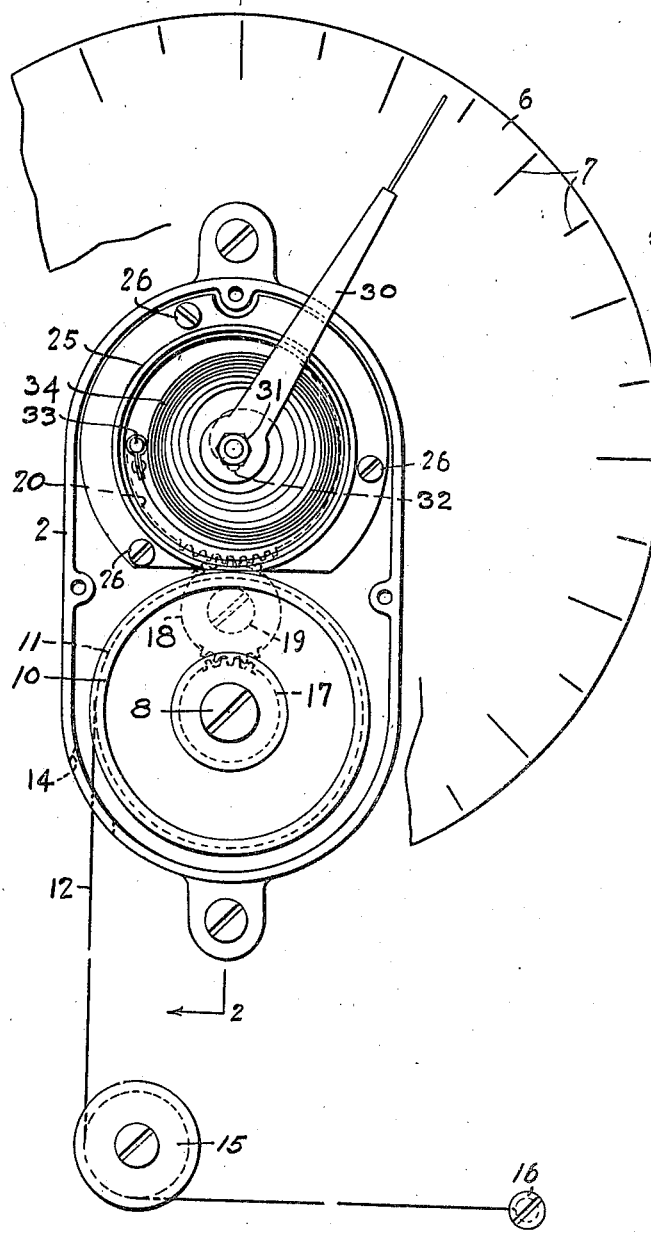
Figure 2:
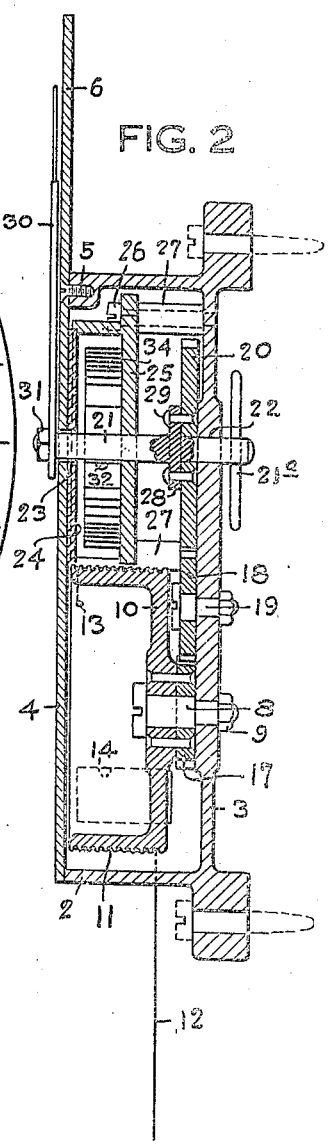

In the accompanying drawing, Fig. 1 is a vertical elevation of my improved indicator with the front plate of the casing removed and showing the dial or scale partly broken away; and Fig. 2 is a section on the line 2—2, Fig. 1.

The numeral 2 designates a suitable casing for containing the parts of my invention, said casing being composed of the back-plate 3 and the removable front-plate 4 secured in place by screws 5, said front plate having the extension 6 which acts as the dial with the graduations 7 formed thereon.

Mounted on the stud 8, secured in the back-plate by the nut 9, is the drum 10, said drum having the grooves 11 formed therein to receive the cord or cable 12 which is secured at 13, and passing around said drum passes out through the opening 14 in the casing, whence, for purpose of illustration, said cord may pass around the sheave 15 to the stationary support 16. The drum 10 is loosely mounted on the stud 8, and connected to said drum is the pinion 17 likewise loosely mounted on said stud, and said pinion meshes with the pinion 18 on the stud 19. The pinion 18 meshes with the gear-wheel 20 mounted on the indicator-shaft 21 which passes through an opening 22 in the rear-plate 3 and through coinciding openings 23 in the removable front-plate 24 of the spring-box 25, said spring-box being secured in place by screws 26 passing through the posts 27 on the back-plate 3.

The indicator shaft 21 has the flange 28 formed thereon and said flange is connected by rivets 29 to the gear-wheel 20.

An indicator-hand 30 is connected to the outer end of the shaft 21, said indicator-hand being held in place by the nut 31. At the rear of the shaft 21 is the handle 21ª.

A spring 34 is connected to the shaft 21 at 32, and the opposite of said spring is connected to the spring-box 25 at 33.

My invention is particularly applicable for use in connection with a camera-extension indicator such as illustrated and described in an application filed by me on the 7th day of July, 1921, Serial No. 483,011. In that apparatus there is an indicator mounted on the camera-frame, and a line or cord leading from the drum to a fixed point, so that when the rear-end of the camera frame is moved the distance will be recorded by the indicator through the indicator hand moving over the dial. In the construction of indicator there illustrated, the spring was mounted in the swinging drum corresponding to the drum 10 in the present case, and there was gearing between the drum and the indicator-hand. With the spring in the drum, however, there was a vibration or oscillation of the indicator-hand, due to the lost play in the gearing between the indicator-hand and the drum. In the present case, however, all this oscillation or vibration has been eliminated by having the spring mounted on the indicator-shaft, so that the lost play between the gears is taken up and the indicator hand moves in a steady, even manner to the proper point on the scale and comes to a stop there without any vibration or oscillation, so that the scale may be read at once without having to wait for the cessation of any such vibrations or oscillations.

What I claim is:

1. In an indicator, the combination with a suitable frame or casing, of a rotary drum mounted therein, a spring actuated indicator-shaft, an indicator-hand mounted thereon, and gearing connections between said drum and said shaft.

2. In an indicator, the combination with a suitable frame or casing, a rotary drum mounted therein, an indicator-shaft, a spring connected to said shaft, and to said drum, an indicator-hand on said shaft, and gearing connections between said drum and said shaft.

In testimony whereof, I, the said EDWARD F. KINZLER, have hereunto set my hand.

EDWARD F. KINZLER.

Witnesses:
JOHN F. WILL,
HENRY HOLZ.